(12) United States Patent
Park et al.

(10) Patent No.: US 8,876,609 B2
(45) Date of Patent: Nov. 4, 2014

(54) METHOD OF EXECUTING VIDEO GAME IN MOBILE TERMINAL AND SYSTEM FOR PERFORMING THE SAME

(75) Inventors: Jong In Park, Gyeonggi-do (KR); Dong Hoon Han, Gyeonggi-do (KR); Sung Wouk Kang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 384 days.

(21) Appl. No.: 12/691,032

(22) Filed: Jan. 21, 2010

(65) Prior Publication Data

US 2010/0190549 A1 Jul. 29, 2010

(30) Foreign Application Priority Data

Jan. 23, 2009 (KR) .................. 10-2009-0006251

(51) Int. Cl.
*A63F 13/00* (2014.01)
*A63F 13/30* (2014.01)

(52) U.S. Cl.
CPC ........... *A63F 13/12* (2013.01); *A63F 2300/406* (2013.01); *A63F 2300/407* (2013.01); *A63F 2300/8064* (2013.01); *A63F 2300/552* (2013.01)
USPC ......... 463/42; 463/9; 463/29; 463/40; 463/41

(58) Field of Classification Search
USPC ........................................... 463/9, 29, 40–42
See application file for complete search history.

(56) References Cited

U.S. PATENT DOCUMENTS

| | | | | |
|---|---|---|---|---|
| 5,695,400 A | * | 12/1997 | Fennell et al. | 463/42 |
| 7,933,955 B2 | * | 4/2011 | Khalatian | 709/205 |
| 2001/0018365 A1 | * | 8/2001 | Orui et al. | 463/40 |
| 2001/0049304 A1 | * | 12/2001 | Orui | 463/42 |
| 2002/0026321 A1 | * | 2/2002 | Faris et al. | 705/1 |
| 2002/0028709 A1 | * | 3/2002 | Finer et al. | 463/42 |
| 2002/0104007 A1 | * | 8/2002 | Moodie et al. | 713/200 |
| 2002/0165024 A1 | * | 11/2002 | Puskala | 463/40 |

(Continued)

FOREIGN PATENT DOCUMENTS

| | | | |
|---|---|---|---|
| JP | 10-314450 | 12/1998 | ............... A63F 9/22 |
| JP | 2004-357897 A | 12/2004 | |

(Continued)

OTHER PUBLICATIONS

Myth II: Soulblighter Instruction Manual [online]. Bungie Software Products Corporation, Copyright 1999, retrieved on [Jul. 11, 2007]. Retrieved from the Internet: URL: http://replacementdocs.com>.*

*Primary Examiner* — Dmitry Suhol
*Assistant Examiner* — David Duffy
(74) *Attorney, Agent, or Firm* — Cha & Reiter, LLC

(57) ABSTRACT

A game execution method and system of a mobile terminal includes an Internet-based device synchronized with at least one mobile terminal through a game server and receiving a specific game screen that is requested from the mobile terminal from the game server to display. The game server synchronizes the Internet-based device with the at least one mobile terminal and transmits return data with respect to an input signal of manipulating the specific game to the mobile terminal. The mobile terminal downloads and executes game data, transmitting to the game server the input signal of manipulating the specific game, and executes an effect function corresponding to the return data.

22 Claims, 14 Drawing Sheets

(56) References Cited

U.S. PATENT DOCUMENTS

| | | | |
|---|---|---|---|
| 2003/0114224 A1* | 6/2003 | Anttila et al. | 463/40 |
| 2004/0072135 A1* | 4/2004 | Unsicker | 434/322 |
| 2005/0039210 A1 | 2/2005 | Dusenberry et al. | |
| 2006/0092268 A1* | 5/2006 | Ahn et al. | 348/14.08 |
| 2006/0229122 A1* | 10/2006 | Macke | 463/16 |
| 2007/0202937 A1* | 8/2007 | Peires et al. | 463/9 |
| 2007/0249420 A1 | 10/2007 | Randall | |
| 2008/0102916 A1* | 5/2008 | Kovacs et al. | 463/16 |
| 2008/0119281 A1 | 5/2008 | Hirose et al. | |
| 2009/0075697 A1* | 3/2009 | Wilson et al. | 455/557 |
| 2009/0106422 A1* | 4/2009 | Kriewall | 709/225 |
| 2009/0149234 A1* | 6/2009 | Van Luchene | 463/9 |
| 2012/0077586 A1* | 3/2012 | Pishevar | 463/31 |
| 2012/0079080 A1* | 3/2012 | Pishevar | 709/220 |

FOREIGN PATENT DOCUMENTS

| | | | | |
|---|---|---|---|---|
| JP | 2005-230290 A | 9/2005 | | |
| JP | 2008-125659 A | 6/2008 | | |
| JP | 2009-000163 A | 1/2009 | | |
| JP | 2009-000524 A | 1/2009 | | |
| KR | 2003-26680 | 4/2003 | | H04Q 9/00 |
| KR | 2004-91950 | 11/2004 | | G06F 19/00 |

* cited by examiner

METHOD OF EXECUTING VIDEO GAME IN MOBILE TERMINAL AND SYSTEM FOR PERFORMING THE SAME

CLAIM OF PRIORITY

This application claims the benefit of priority from Korean Patent Application No. 10-2009-0006251, filed on Jan. 23, 2009, the entire contents of which are incorporated herein by reference in its entirety.

BACKGROUND OF THE INVENTION

1. Field of the Invention

The present invention relates generally to a method of executing a video game and a system for performing the same. More particularly, the present invention relates to a method of allowing users of mobile terminals to use a video game system in which a plurality of input units are connected the Internet such that a plurality of users may play the video games.

2. Description of the Related Art

In recent years, mobile terminals have increasing provided various additional functions in addition to traditional voice communication, such as, for example, a camera function, a digital multimedia broadcasting (DMB) function, a music reproduction function, a multimedia reproduction function, a mobile game function, etc., just to name a few possible functions. In particular, the mobile game function is widely popular due in part to improved performance and rising levels of service quality of the mobile terminals. The mobile game functions can be serviced, for example, by users accessing a game service using mobile terminals and then playing the mobile game.

On the other hand, there is a conventional game system in which a plurality of input units is connected to a single display unit by wires and permit a plurality of users may play video games.

However, the conventional game system has a limited number of input units to be connected by wires, so that the number of users to play video games is limited, and remote users using existing input units that are connected by wires cannot control the video games. When the number of users is increased, interference of the wired input units increases, and satisfaction with the game system decreases. In addition, in the mobile games, since display units of the mobile terminals are restricted in size typically to several inches in diameter, it is difficult to express the graphical details that often enhance the enjoyment of the game because of the restricted screen size.

SUMMARY OF THE INVENTION

The present invention provides a game executing method and system in which a plurality of mobile terminal users manipulates a video game while watching screens of Internet-based devices on which the video game is executed and the playing results of the video game may be fed back to the users.

The present invention also provides a mobile terminal game executing method of generating a game genre which includes an on-line effect in which users join a video game, and an off-line effect generated during the playing of the video game are mixed, and a system for performing the same.

The present invention also provides a mobile terminal game system and method of execution in which a plurality of users are freed from a single interface to manipulate a video game such as a remote controller, a joystick, and the like. In addition, the users can play a video game by using their mobile terminal. In addition, the present invention overcomes interference and management issues that occur in the conventional gaming system when there is an increased number of users connected by the mobile terminals.

The present invention also provides a mobile terminal game system and method for providing visual details that normally cannot be realized due on a display of a mobile terminal die to a reduced screen size and performance of a mobile terminal by using an additional Internet-based device having a screen larger than that of the mobile terminal.

In accordance with an exemplary embodiment of the present invention, there is provided a game system including: an Internet-based device synchronized with at least one mobile terminal through a game server and receiving a specific game screen requested by the mobile terminal from the game server to display; the game server synchronizing the Internet-based device with the at least one mobile terminal and transmitting return data with respect to an input signal of manipulating the specific game to the mobile terminal; and the mobile terminal downloading a game data and executing a game, transmitting the input signal for manipulating the specific game to the game server, and executing an effect function corresponding to the return data.

In accordance with another exemplary embodiment of the present invention, there is provided a method of executing a game in a mobile terminal, the method including: downloading data on a specific game in response to detecting a user request; requesting a game server to synchronize a mobile terminal with an Internet-based device when the downloaded specific game is requested to be executed; executing the specific game when the mobile terminal is synchronized with the Internet-based device; transmitting an input signal for manipulating the specific game to the game server; and receiving return data corresponding the input signal from the game server and performing an effect function according to the return data.

In accordance with still another exemplary embodiment of the present invention, there is provided a mobile terminal synchronized with an Internet-based device through a game server and providing a specific game, the mobile terminal including: a wireless communication unit to transmit a synchronization request signal for synchronization when the specific game is requested to be executed and to receive a response signal for the synchronization request signal; an input unit for detecting an input signal for manipulating the specific game; and a controller to request the execution of the specific game and to perform an effect function according to return data corresponding to the input signal.

In accordance with still another exemplary embodiment of the present invention, there is provided a method of executing a game including: establishing, by an Internet-based device, a communication channel with a game server; receiving, by an Internet-based device, a synchronization request signal from at least one mobile terminal through the game server; synchronizing the Internet-based device with the at least one mobile terminal through the game server; and receiving and outputting, by the Internet-based device, a screen of a game that is requested to execute by the at least one mobile terminal from the game server.

BRIEF DESCRIPTION OF THE DRAWINGS

The features and advantages of the present invention will become more apparent from the following detailed description in conjunction with the accompanying drawings, in which.

DETAILED DESCRIPTION

Hereinafter, exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention by a person of ordinary skill in the art.

In exemplary embodiments of the present invention, the term "Internet-based device" refers to a device including a game application program, connected to a game server and a mobile terminal through Internet network via transmission control protocol/Internet protocol (TCP/IP), and to receive a game screen executed in the mobile terminal from the game server to display the game screen, such as an internet protocol television (IPTV), a large format display (LFD), and a digital television. Moreover, a plurality of mobile terminal users may play video games while viewing a screen of the Internet-based devices.

In the exemplary embodiments of the present invention, a quiz game will be described for an example. However, the appended claims are not limited to the exemplary embodiments provided herein, but may, for example, include rather a subjective type game requiring a phrasal answer and an objective type game, in other words, an O/X game, a true/false game, and a multiple choice type game, just to name a few possibilities.

Figure 1:
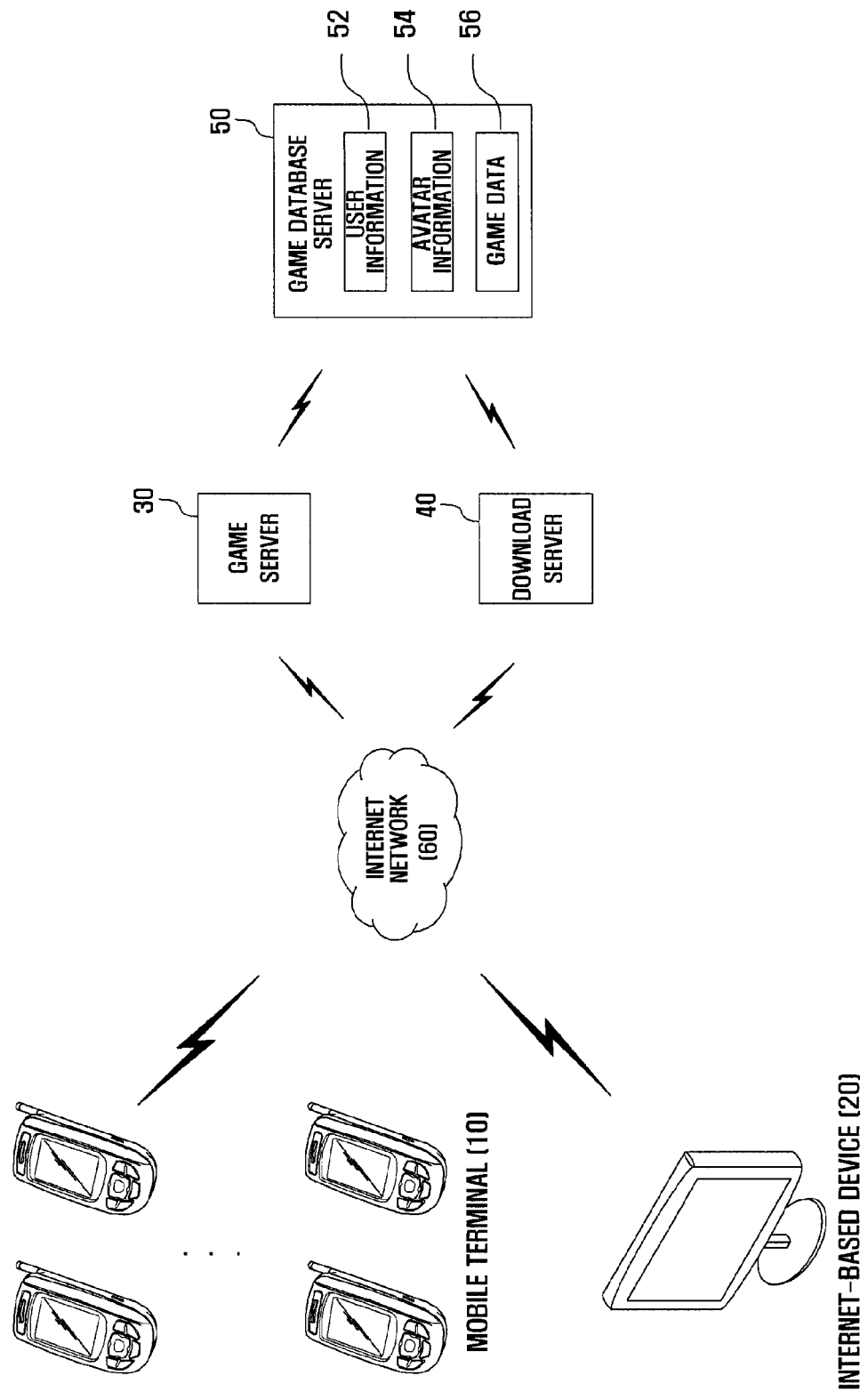
FIG. 1 is a schematic view illustrating a game system according to an exemplary embodiment of the present invention.

FIG. 1 is a schematic view illustrating a game system according to an exemplary embodiment of the present invention.

Referring now to FIG. 1, a game system according to an exemplary embodiment of the present invention includes at least one mobile terminal 10, an Internet-based device 20, a game server 30, a download server 40, a game database server 50, and an Internet network 60. A person of ordinary skill in the art should understand and appreciate that with regard to the claimed invention the functionality of the servers may be combined in whole or part. In addition, in the case of popular games, it is within the spirit and scope of the claimed invention that proxy servers might also be included to provide the functions of some/all of the servers shown.

The mobile terminal 10 receives various services through the Internet network 60. Particularly, the mobile terminal 10 employed in the exemplary embodiment of the present invention may initiate the request the connection with the Internet-based device 20 to the game server 30. In this example, the game server 30 and the Internet-based device 20 may be connected to each other through the Internet network 60. That is, the Internet-based device 20 may be connected directly to the game server 30 according to a demand from a user and the game server 30 may confirm an IP of the Internet-based device 20. After that, the mobile terminal 10 may be connected to the Internet-based device 20 via an IP address acquired from the game server 30.

When the mobile terminal 10 is connected to the Internet-based device 20, a quiz game screen of the mobile terminal 10 may be displayed on a display unit of the Internet-based device 20 through the game server 30. Moreover, when a plurality of mobile terminals 10 uses the quiz game through the Internet-based device 20, each of the mobile terminals 10 is synchronized by the game server 30 to display a corresponding quiz game executing screen.

In an exemplary operation, the mobile terminal 10 accesses the download server 40 via the Internet network 60 in order to download quiz game data. In this case, the quiz game data may include a game room access screen, a quiz solution screen, avatar information, and game execution data. When a user inputs a quiz execution signal, the mobile terminal 10 may request the game server 30 to execute a quiz game. When the quiz game is executed, the mobile terminal 10 may request the game server 30 to create a game room according to the user request. After that, when the game room is created, the mobile terminal 10 may be assigned as a chairman of the created game room. The mobile terminal 10 may access a quiz game room created in advance according to a user request. In other words, when the quiz game is executed, the mobile terminal 10 accesses a specific game room selected from a list of a plurality of game rooms that is provided by the game server 30 to the user to execute a quiz game. When the mobile terminal 10 accesses the specific game room, the mobile terminal 10 is synchronized preferably with a mobile terminal which created the specific game room and is assigned as a chairman of the specific game room and may execute the quiz game.

The mobile terminal 10 may transmit an input signal to the game server 30 to manipulate the quiz game. For example, the mobile terminal 10 may transmit data to the game server 30 corresponding to an answer for the quiz game that is input by the user. After that, the mobile terminal 10 may receive a return data, for example, which may indicate whether the transmitted data is the correct answer, and may execute an effect function corresponding to the return data. The effect function may be executed by at least one of visual, audible, and touchable ways. For example, the mobile terminal 10 may execute at least one of effect functions of generating vibration at a preset period, displaying a message of indicating whether an answer is correct on a screen, and outputting an audio signal of indicating whether the answer is correct using sound.

The Internet-based device 20 may be connected to the mobile terminal 10, the game server 30, and the download server 40 through the Internet network 60. Particularly, the Internet-based device 20 employed in this exemplary embodiment of the present invention may access the game server 30 according to the user request for access.

The Internet-based device 20 may be connected to the mobile terminal 10 via the Internet network 60. That is, when the Internet-based device 20 accesses the game server 30, the game server 30 may check an IP of the Internet-based device 20 and may make a connection of the mobile terminal 10 with the Internet-based device 20 having the acquired IP according to the user request. When the Internet-based device 20 is connected to the mobile terminal 10, the quiz game screen of the mobile terminal 10 may be displayed on a display unit of the Internet-based device 20 under the control of the game server 30.

When the quiz game is executed in the mobile terminal 10, the Internet-based device 20 displays the quiz game execution screen. The Internet-based device 20 may display a quiz game room creation screen that is executed in the mobile terminal 10.

The Internet-based device 20 may receive the return data including information on a user of the mobile terminal who correctly answer from the game server 30 to display the same on the screen. At that time, the return data may include sound and message information based on correct or wrong answer for the quiz game.

The game server 30 preferably manages overall function for playing the quiz game. The game server 30, for example, may transmit a corresponding quiz game execution screen to the mobile terminal 10 and the Internet-based device 20 according to the request of the mobile terminal 10 for the execution of the quiz game. In this case, the game server 30 may transmit the game room creation screen according to a user request of the mobile terminal 10 for the game room creation. When the game room is created, the game server 30 may, for example, assign the mobile terminal 10 that has created the game room as a chairman of the game room.

The game server 30 may transmit data on the game room such as a title of the game room, password setting, and a chairman of the game room to the game database server 50. The game server 30 may perform user verification, for example, by using a serial number of the mobile terminal 10 of a user who accesses the quiz game as identification information. In this particular case, the serial number of the mobile terminal 10 may be used as the identification (ID) of the user when the quiz game is executed.

Thus, the game server 30 may authenticate game room access with the serial number of the mobile terminal as corresponding identification information according to the request signal for the game room from the mobile terminal. It is also within the spirit and scope of the invention that other criteria may be used for authentication in addition to or in lieu of serial number information, such as, for example, passwords. In this particular case, when another mobile terminal is authenticated and accesses the game room, the game server 30 synchronizes the mobile terminal 10 that has created the game room with the Internet-based device 20 and transmits data required to execution of the quiz game. Here, the game server 30 may transmit data to the Internet-based device 20, such as avatar information and user information that corresponds to the user.

When the mobile terminal 10 requests execution of the quiz game, in response the game server 30 may, for example, execute the quiz game and may transmit the corresponding quiz game screen to the mobile terminal 10. When the Internet-based device 20 is synchronized with the mobile terminal 10, the game server 30 transmits the quiz game screen to the Internet-based device 20 in lieu of or in addition to the mobile terminal 10. In this case, the game server 30 may transmit the quiz game date such as a game room access screen configuration, a screen configuration according to an avatar, a screen configuration corresponding to user information, a game room creation screen configuration, and a quiz solution screen configuration. In this exemplary embodiment of the present invention, the game server 30, when a plurality of mobile terminals use the quiz game through the Internet-based device 20, may synchronize the mobile terminals and may transmit the quiz game screen to the Internet-based device 20.

The game server 30 may receive data from the mobile terminal 10 during the execution of the quiz game. In this case, the game server checks whether the received data are the data corresponding to an answer for the quiz game and may determine whether the data is the correct answer when the data corresponds to the correct answer of the quiz game.

The game server 30 determines the data and may transmit and may transmit return data for whether the data is the correct answer to the mobile terminal 10. For example, when the quiz game corresponds to a game requiring an objective answer, the game server 10 may transmit return data corresponding to whether the answer is correct to the mobile terminal 10 and may transmit data including information on a user who correctly answered to the quiz to the Internet-based device 20. When a plurality of mobile terminals use the quiz game, the game server 30 may transmit corresponding return data to the respective mobile terminals. For example, in a state when a mobile terminal A, a mobile terminal B, and a mobile terminal C access a same game room and when the mobile terminal A has transmitted data that is determined to be a correct answer, the game server 30 may transmit return data including information that the data are true to the mobile terminal A and may transmit return data to the remaining mobile terminals, (that is, the mobile terminal B and the mobile terminal C) including information that the answer provided by mobile terminal A is the correct answer.

The download server 40 manages the overall download executed by the request from the mobile terminal 10 for the download of the quiz game data. The download server 40 may transmit corresponding quiz game date to the mobile terminal 10 according to the request for the quiz game data download from the mobile terminal 10. In this case, the download server 40 may be connected to the game database server 50 and may execute a serial operation relating to updating such as the user information, avatar information, and the like.

The game database server 50 includes storage or access to storage for the storage and access of data required to execute the quiz game. For the game database server 50 may include user information 52, avatar information 54, and game data 56. The user information 52 corresponds to information on the quiz game user and may store the remaining information except for the number of a mobile communication company and a telephone office number of the user mobile terminal 10. The avatar information 54, for example, may correspond to an Internet character to be selected by the user (or the game) who uses the quiz game and various types of kinds may be selected. The game data and may be updated in real time.

The internet network 60 connects the mobile terminal 10 to the Internet-based device 20. The Internet network 60 connects a plurality of mobile terminals, the Internet-based device 20, and various servers to each other. In this case, the mobile terminal 10 may be connected to the Internet-based device 20 via a wireless Internet. The Internet network 60 may connect a plurality of Internet-based devices 20 to each other. In such a case, the plurality of Internet-based devices connected to each other via the Internet network 60 may display the quiz game screen of a same game room. There may be a respective Internet-based device 20 for each mobile terminal, or the mobile terminals may share one or more of such devices.

Figure 2:
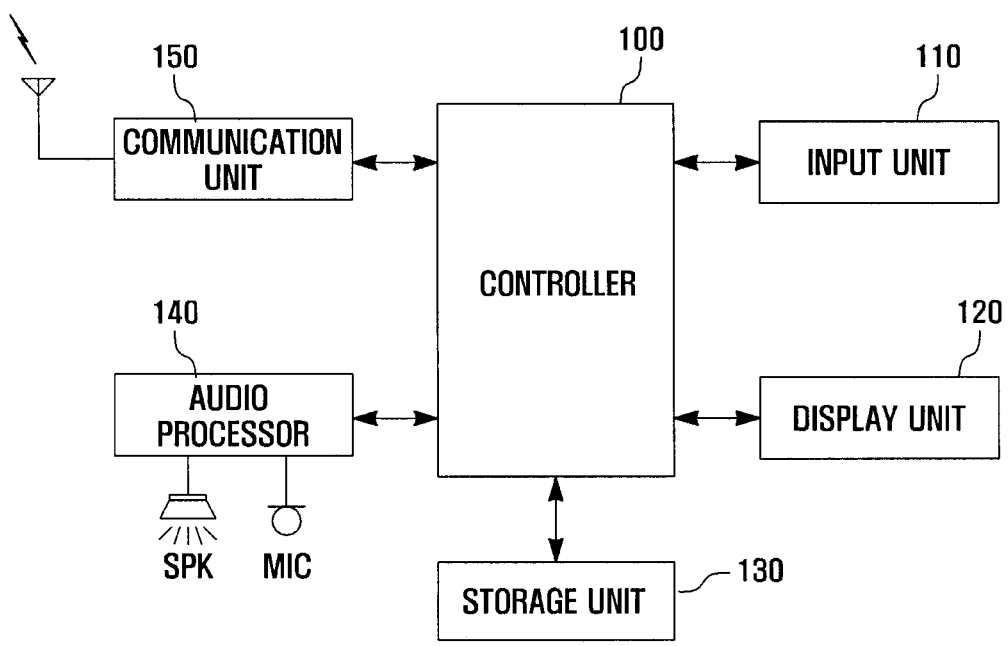
FIG. 2 is a schematic block diagram illustrating a mobile terminal employed in an exemplary embodiment of the present invention.

FIG. 2 is a schematic block diagram illustrating a mobile terminal employed in an exemplary embodiment of the present invention.

Referring now to FIG. 2, the mobile terminal 10 employed in this exemplary embodiment of the present invention includes an input unit 110, a display unit 120, a storage unit 130, an audio processor 140, a wireless communication unit 150, and a controller 100.

The input unit 110 receives an input of various information, such as, for example a numeral key and arrow key information and transmits a signal related to various functional setting and functional control of the mobile terminal 10 to the controller 100. The input unit 110 generates an input signal caused by user action and may include at least one of a keypad and a touch pad for the generation of the input signal. In addition, the input unit 110 and the display unit 120 may be configured by a single touch panel (or a touch screen) to perform an inputting function and a displaying function simultaneously. The input unit 110 transmits a request signal for download of the quiz game data input by the user and a quiz game execution signal to the controller 100. The input unit 110 may transmit a request signal for creation of a game room and a signal of selecting a game room to the controller 110. The input unit 110 may transmit a numeral key signal input by the user during the execution of the quiz game to the controller 100. The input unit 110 may transmit an input signal of manipulating a specific game to the controller 100.

The display unit 120 displays an output of information such as operating state generated and operation results during the functional execution of the mobile terminal 10. The display unit 120 may display a menu of the mobile terminal 10 and user data input by the user. The display unit may be a liquid crystal display (LCD). The display unit 120 employed in this exemplary embodiment of the present invention may display the quiz game execution screen and a corresponding screen that is received from the game server 30. The quiz game execution screen displayed on the display unit 120 may be displayed on display units of other mobile terminals and the Internet-based device 20 which play the quiz game together.

The storage unit 130 stores application programs required to perform operations used in this exemplary embodiment of the present invention. The storage unit 120 includes a program area and a data area.

The program area may store an operating system to boot the mobile terminal 10, a program to make the mobile terminal 10 access the quiz game, and a program for executing the effect function according to the return data that are received from the game server 30. The data area may store data generated when the quiz game of the mobile terminal 10 is executed.

The audio processor 140 is connected to a microphone MIC and a speaker SPK, datamates an audio signal received from the microphone MIC to transmit the datamated audio signal to the controller 100, and converts the audio signal input from the controller 100 into audible sound to output the audible sound through the speaker SPK. That is, the audio processor 140 may convert an analog audio signal input from the microphone MIC into a digital audio signal and may convert the digital audio signal input from the controller 100 into an analog audio signal to be output through the speaker SPK. In this exemplary embodiment of the present invention, the audio processor 140 may output a predetermined or use-selected sound effect corresponding to the return data received from the game server 30 under the control of the controller 100. A person of ordinary skill in the art understands and appreciates that piezoelectric vibration can be provided in addition to or in lieu of audio.

The wireless communication unit 150 may preferably include a radio frequency (RF) transmitter to perform up-conversion of frequency of a signal to be transmitted and amplify the frequency and an RF receiver to perform low noise amplification of a received signal and down-conversion of the frequency thereof. In this exemplary embodiment of the present invention, the wireless communication unit 150 requests the game server 30 such that the quiz execution screen may be synchronized with the Internet-based device 20 and other mobile terminals. In other words, the wireless communication unit 150 may transmit a synchronization request signal for synchronization before, after, or while requesting a specific game to be executed, and may receive a response signal with respect to the synchronization request signal. The wireless communication unit 150 may transmit the return data when the return data are received from the game server 30.

With continued reference to FIG. 2, the controller 100 controls overall operation of respective components of the mobile terminal 10 and signal flow among respective functional blocks of the mobile terminal 10. In this exemplary embodiment of the present invention, the controller 100 may request the game server 30 to connect the mobile terminal with the Internet-based device 20. In this case, the game server 30 is connected with the Internet-based device 20, for example, through the Internet network 60 in advance and the mobile terminal 10 may be connected with the Internet-based device 20 through the game server 30 according to a corresponding IP of the mobile terminal 10.

The controller 100 requests the download server 40 to download the quiz game data according to the user request. After that, the controller 100 may request the game server 30 to create a game room according to the quiz game room creation signal input from the input unit 110.

The controller 100 may execute the quiz game according to the user request. When the mobile terminal 10 is connected to the game server 30, the controller 100 may receive the quiz game execution screen from the game server 30 to display the same on the display unit 120.

The controller 100 may transmit corresponding data to the game server 30 according to an input signal from the input unit 110 that is generated to manipulate a game during playing of the game, for example a number key input signal. Then, the controller 100 may receive return data with respect to the input signal from the game server 30 through the wireless communication unit 150. In this case, the controller 100 may execute a corresponding effect function according to the received return data.

Figure 3:
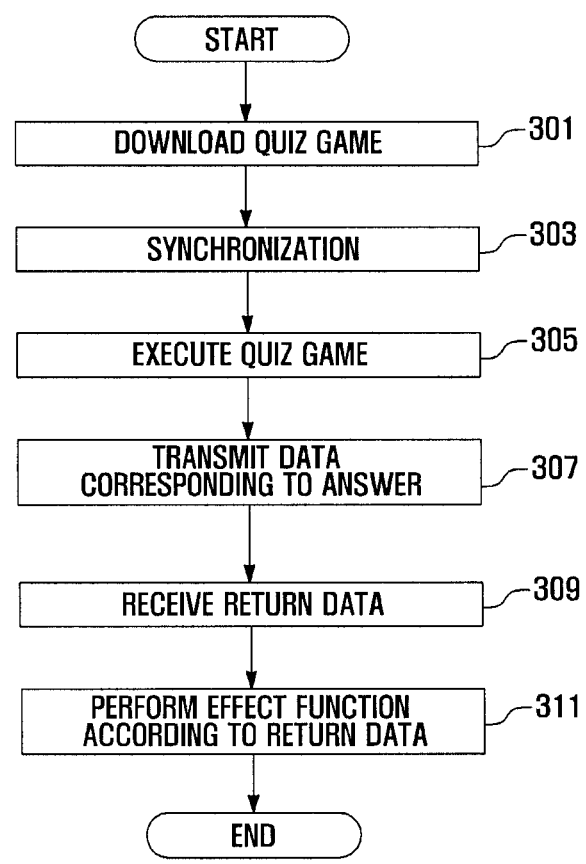
FIG. 3 is a flowchart illustrating an example of overall operation of a game system according to an exemplary embodiment of the present invention.

FIG. 3 is a flowchart illustrating an example of overall operation of a game system according to an exemplary embodiment of the present invention.

Referring now to FIG. 3, the mobile terminal 10 downloads the quiz game data according to the user request (301). In this case, the mobile terminal 10 may download the quiz game data from the download server 40 through the Internet network 60. The quiz game data may be encoded by a message unit to be transmitted to and executed in the mobile terminal 10 according to the IP.

When the quiz game data are downloaded, the mobile terminal 10 may be synchronized with the Internet-based device 20 and other mobile terminals through the game server (303). At this time, the mobile terminal 10 may acquire the IP of the Internet-based device 20 through the game server 30 and may be connected to the Internet-based device 20 having the corresponding IP. The mobile terminal 10 may be synchronized with other mobile terminals which are executing the quiz game in the game room through the game server 30. With the synchronization, the mobile terminal 10, the Internet-based device 20, and other mobile terminals may receive execution data of the quiz game from the game server 30 to display the data on their screens.

The mobile terminal 10 may detect a quiz game execution signal (305). When the quiz game is executed, the mobile terminal 10 may detect a game room creation signal input from a user. At this time, the mobile terminal 10 may transmit a request signal for creating a wire and wireless interworking game room or a wire game room to the game server 30 according to the user input. In this exemplary embodiment of the present invention, the mobile terminal 10, which creates the game room, may be assigned as a chairman of the game room by the game server 30. The creation of the game room by the mobile terminal 10 will be described in detail with reference to FIG. 5, later.

With continued reference to FIG. 3, after the execution of the quiz game, the mobile terminal 10 may transmit data corresponding to the correct answer for the quiz game to the game server 30 (307). The data corresponding to the correct answer of the quiz game may be, for example, data created by the number key input signal that is input by the user.

After that, the mobile terminal 10 receives the return data from the game server 30 (309). The return data may be data including information that is used to determine whether the answer for the quiz game is a correct answer.

When the return data are received, the mobile terminal 10 executes a corresponding effect function by checking the return data (311). When the return data are the correct answer, the mobile terminal 10 may execute an effect function corresponding to the correct answer. When the return data are a wrong answer, the mobile terminal 10 may execute an effect function corresponding to the wrong answer. For example, it may state that the answer is wrong, and/or to please try again.

Figure 4:
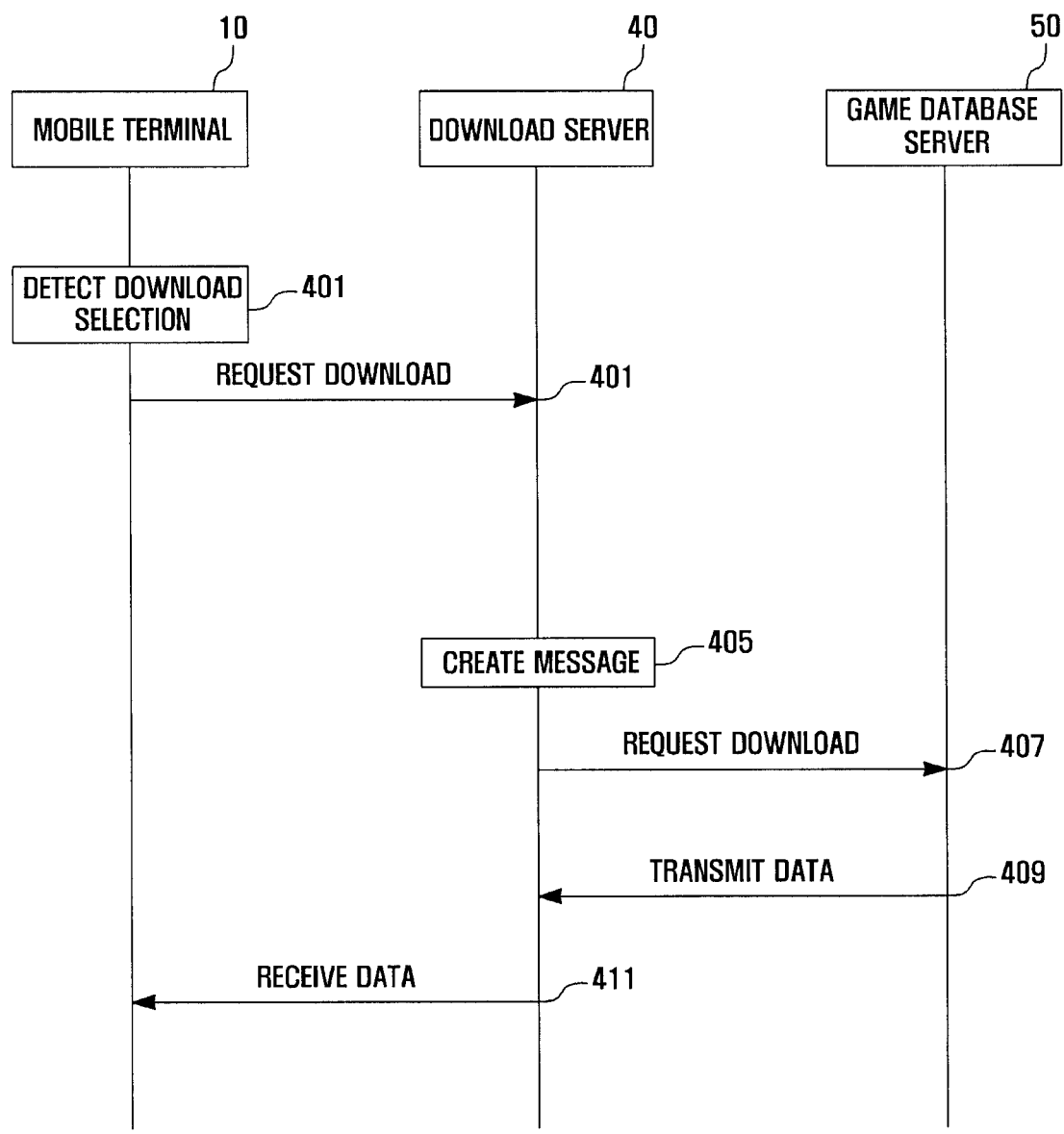
FIG. 4 is a sequential diagram illustrating data flow in game data downloading of the game system according to the exemplary embodiment of the present invention.

FIG. 4 is a sequential diagram illustrating data flow in game data downloading of the game system according to an exemplary embodiment of the present invention.

Referring now to FIG. 4, the mobile terminal 10 may detect the quiz game data download request signal that is input by the user (401). When the download selection is detected, the mobile terminal 10 transmits the quiz game data download request signal to the download server 40 (403). The mobile terminal 10 may download the game data and the user avatar information during the quiz game data download.

When the download is requested, the download server 40 may create a quiz game data request message according to IP (405). Then, the download server 40 transmits a message of requesting for the quiz game data to the game database server 50 (407). In this case, the game database server 50 may store the user information, the avatar information, and information on the game data. It is also possible that the download server 40 does not create the message but rather transfers the request received from the mobile terminal 10.

The download server receives the quiz game data from the game database server 50 (409). After that, the mobile terminal 10 may receive the quiz game data from the download server 40 (411).

Figure 5:
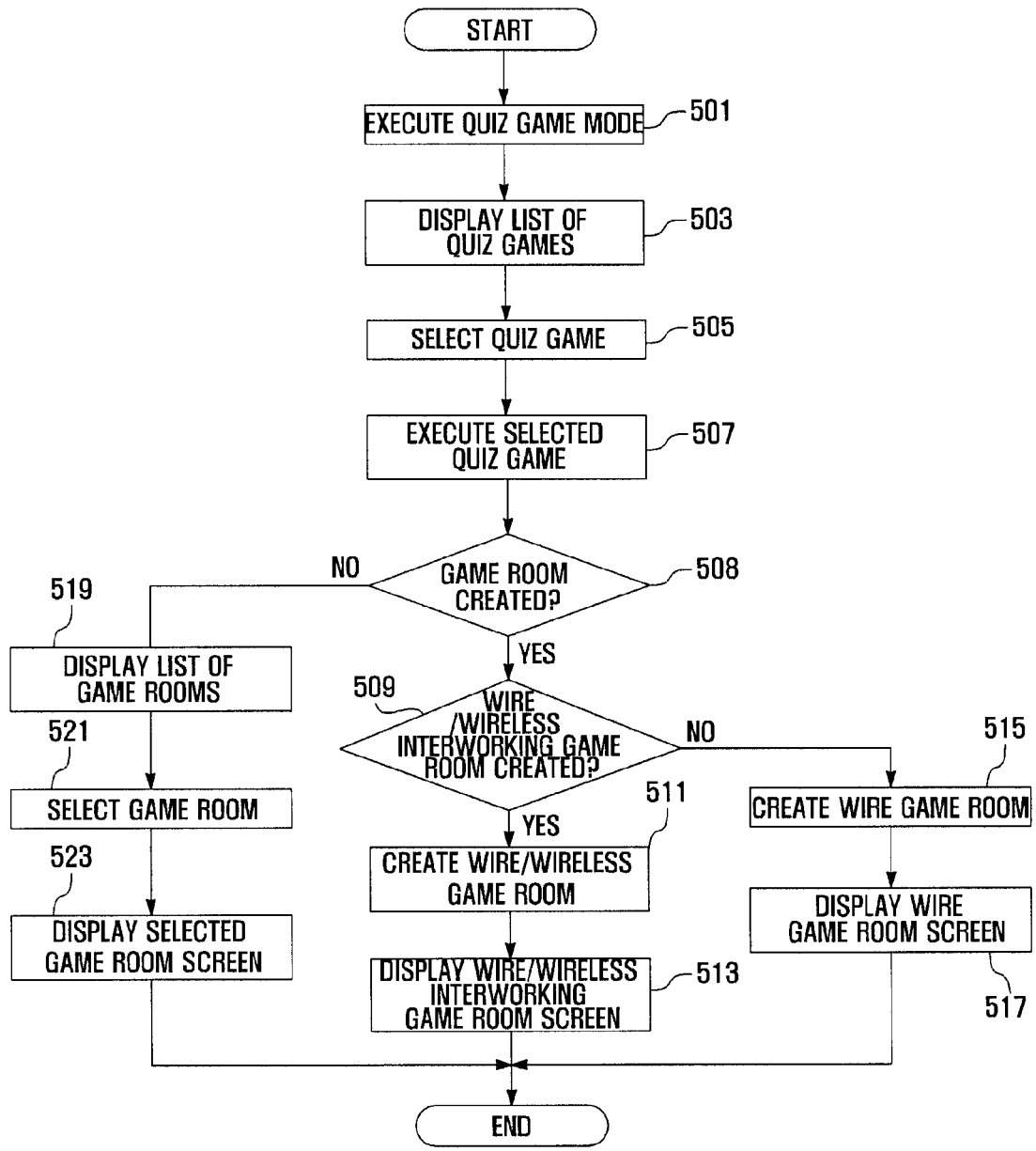
FIG. 5 is a flowchart illustrating a game room creation according to an exemplary embodiment of the present invention.

FIG. 5 is a flowchart illustrating a game room creation according to an exemplary embodiment of the present invention, and FIGS. 6 to 16 are views illustrating exemplary screens showing the game room creation according to exemplary embodiments of the present invention.

Referring now to FIGS. 5 to 16, the mobile terminal 10 detects a quiz game mode execution signal input by the user (501). The signal could be pressing or touching a key, clicking on a link, etc. The mobile terminal 10 may be connected to the Internet-based device 20 through the game server 30 in a quiz game mode. A quiz game screen displayed on the display unit 120 of the mobile terminal 10 may be synchronized by the game server 30 and displayed on a display unit of the Internet-based device 20.

Figure 6:
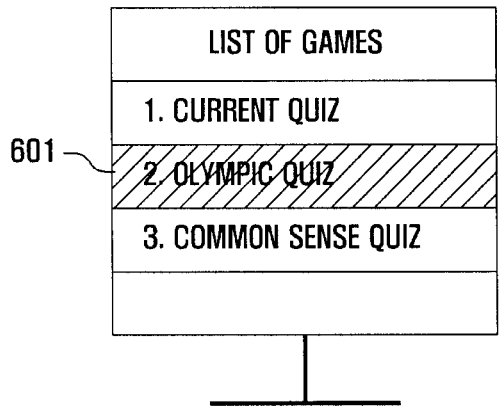
FIGS. 6 to 16 are views illustrating exemplary screens showing the game room creation according to an exemplary embodiment of the present invention.

When the quiz game mode is executed the mobile terminal 10 displays a quiz game list that is downloaded from the download server 40 (503). The quiz game list may be displayed on the display unit of the Internet-based device 20. For example, as illustrated in FIG. 6, the downloaded quiz game list such as '1. Current quiz,' '2. Olympic quiz,' and '3. Common sense quiz' may be displayed on the display unit of the Internet-based device 20.

When the quiz game list is displayed, the mobile terminal 10 may detect a selection signal for a specific game that is input from the quiz game list (505). Then, the mobile terminal 10 executes a corresponding specific quiz game according to a specific quiz game execution signal (507). In this case, the mobile terminal 10 may transmit an input signal for the selected specific quiz game to the game server 30.

For example, as illustrated in FIG. 6, the user of the mobile terminal 10 may transmit an input signal for '2. Olympic quiz' 601 selected from the quiz game list that is displayed on the display unit of the Internet-based device 20 to the game server 30 and may execute the quiz game data received from the game server 30.

Figure 7:
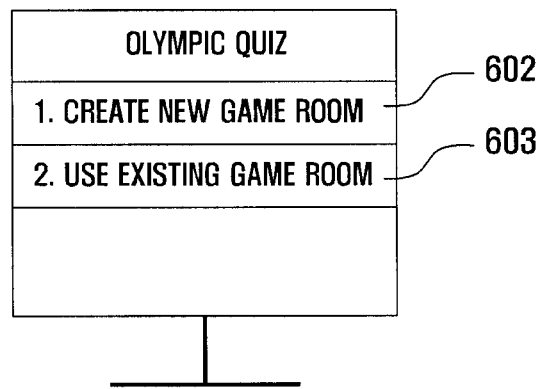

When the quiz game is executed, the mobile terminal 10 may determine, for example, whether a game room is created (508). For example, as illustrated in FIG. 7, the Internet-based device 20 displays a list of '1. Create new game room' 602 and '2. Use existing game room' 603 on the display unit and the mobile terminal 10 may execute a function selected whether the user creates a game room.

Figure 8:
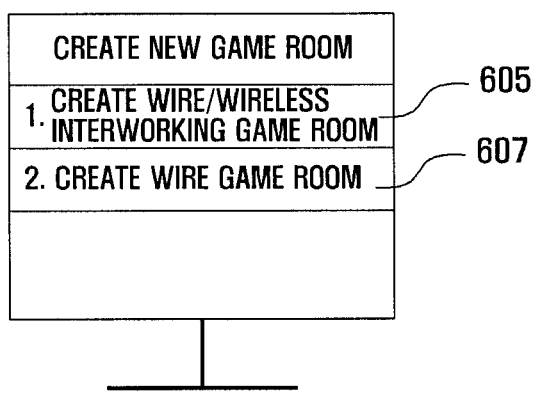

When the 'Create new game room' 602 is selected, the mobile terminal 10 determines whether a wire and wireless interworking game room is created (509). For example, as illustrated in FIG. 8, the Internet-based device 20 may display a list of '1. Create wire/wireless interworking game room' 605 and '2. Create wire game room' 607 on the display unit. The 'wire and wireless interworking game room' refers to a game room created to play the quiz game by connecting the mobile terminal 10 with the Internet-based device 20 with a cable or through wireless Internet. The 'wire interworking game room' refers to a game room created to play the quiz game by connecting the mobile terminal 10 with the Internet-based device 20 with a cable.

Figure 9:
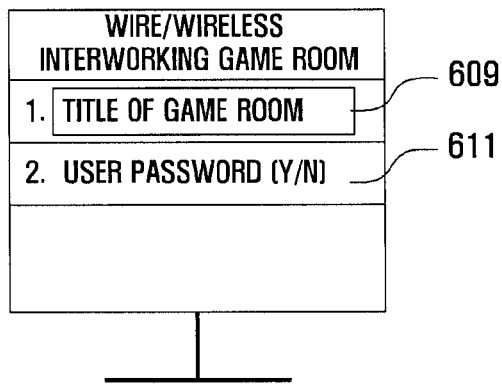

When the '1. Create wire/wireless interworking game room' 605 is selected, the mobile terminal 10 then performs the creation of the wire/wireless interworking game room (511). For example, as illustrated in FIG. 9, the Internet-based device 20 may display a screen to check whether '1. Title of game room' 609 is input and '2. Use password' 611. When the title of a game room and whether a password is used are input, the mobile terminal 10 displays a message indicating a game room is created, in this example, in the form of a popup window. The message may be displayed on the display unit of the Internet-based device 20.

Figure 10:
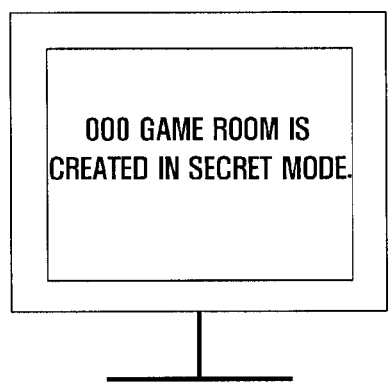
Figure 11:
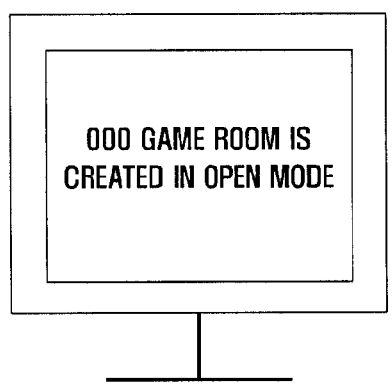

For example, as illustrated in FIG. 10, when the game room is created with setting a password, the Internet-based device 20 may display a popup message 'a game room 000 is created in a secret mode'. Moreover, as illustrated in FIG. 11, when the created game room is created without a password, the Internet-based device 20 may display a popup message 'a game room 000 is created in an open mode'. In this example, the secret mode refers to a mode of allowing only mobile terminals that input the password set by a chairman of the game room to access the game room. The open mode refers to a mode of allowing every mobile terminal to access the game room.

Figure 12:
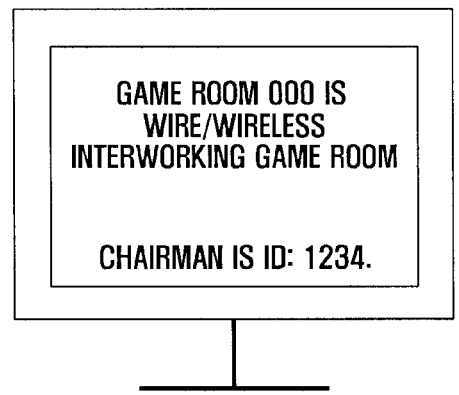

When a wire/wireless interworking game room is created, the mobile terminal 10 displays a corresponding game room screen (513). At this time, the game room screen may be displayed on the display unit of the Internet-based device 20. For example, as illustrated in FIG. 12, on the display unit of the Internet-based device 20, a title of a game room, ID of a chairman of the game room, and a type of a game room may be displayed. In other words, the Internet-based device 20 may display a message 'Game room 000 is wire/wireless interworking. Chairman ID is 1234.'

Figure 13:
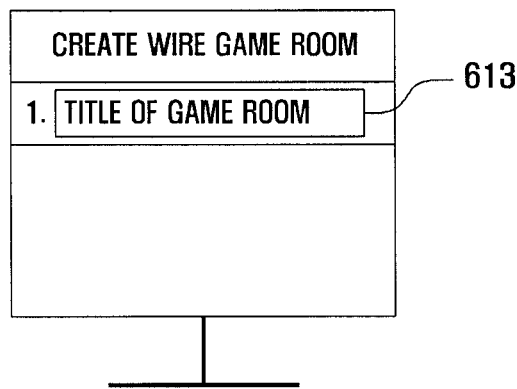
Figure 14:
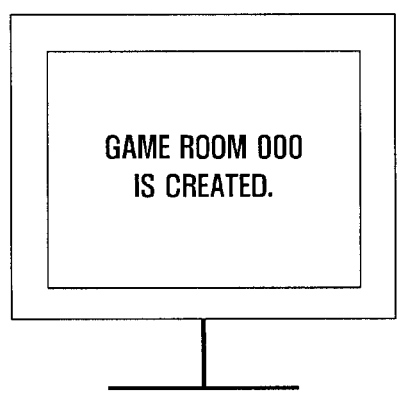

On the other hand when the '2. Create wire game room' 607 is selected, the mobile terminal 10 executes a procedure of creating a wire game room (515). For example, as illustrated in FIG. 13, the Internet-based device 20 may display an input screen '1. Title of game room' 613. When the title of a game room is input by a user, the mobile terminal 10 displays a message of indicating that the game room is completely created preferably in a popup window. In this case, the message may be displayed on the display unit of the Internet-based device 20. For example, as illustrated in FIG. 14, on the display unit of the Internet-based device 20, a popup message '000 game room is created' may be displayed when a wire game room is created.

Figure 15:
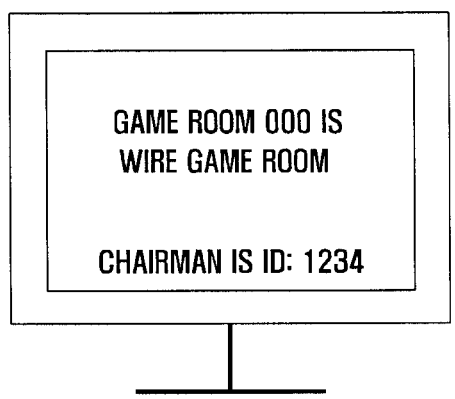

When the wire game room is created the mobile terminal 10 displays a screen for a corresponding game room (517). The screen on the game room may be displayed on the Internet-based device 20. For example, as illustrated in FIG. 15, on the display unit of the Internet-based device 20, a title of the game room, ID of the game room chairman, and type of the game room may be displayed.

Figure 16:
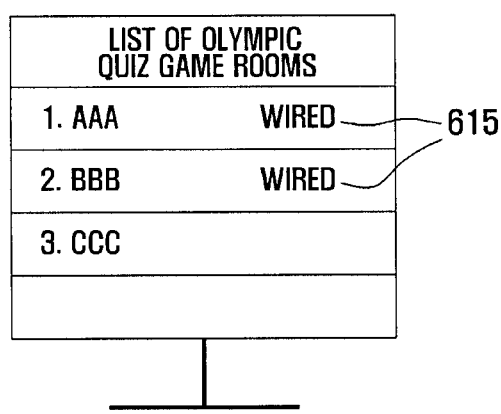

Meanwhile, when '2. Use existing game room' 603 of the screen as illustrated in FIG. 7 is selected the mobile terminal 10 displays a list of existing game rooms (519). The list of the existing game rooms may be displayed on the display unit of the Internet-based device 20. For example, as illustrated in FIG. 16, on the display unit of the Internet-based device 20, a list of game rooms that are already created, that is, the list of the existing game room '1. AAA,' '2. BBB,' and '3. CCC' may be proposed. The mobile terminal 10 may display the list of the existing game rooms such that wire/wireless interworking game rooms are distinguished from wire game rooms. For example, the Internet-based device 20 may mark 'wire' 615 on the list of quiz game rooms '1. AAA' and '2. BBB' to notify the corresponding game rooms as wire game rooms.

When the list of the existing game rooms is displayed, the mobile terminal 10 checks an input for the game room selection (521). After that, when the game room is selected, the mobile terminal 10 displays a screen on the selected game room (523).

In this exemplary embodiment of the present invention, the quiz game screen displayed on the display unit 120 of the mobile terminal 10 may be displayed on the display unit of the Internet-based device 20 which is connected through the game server 30.

Figure 17:
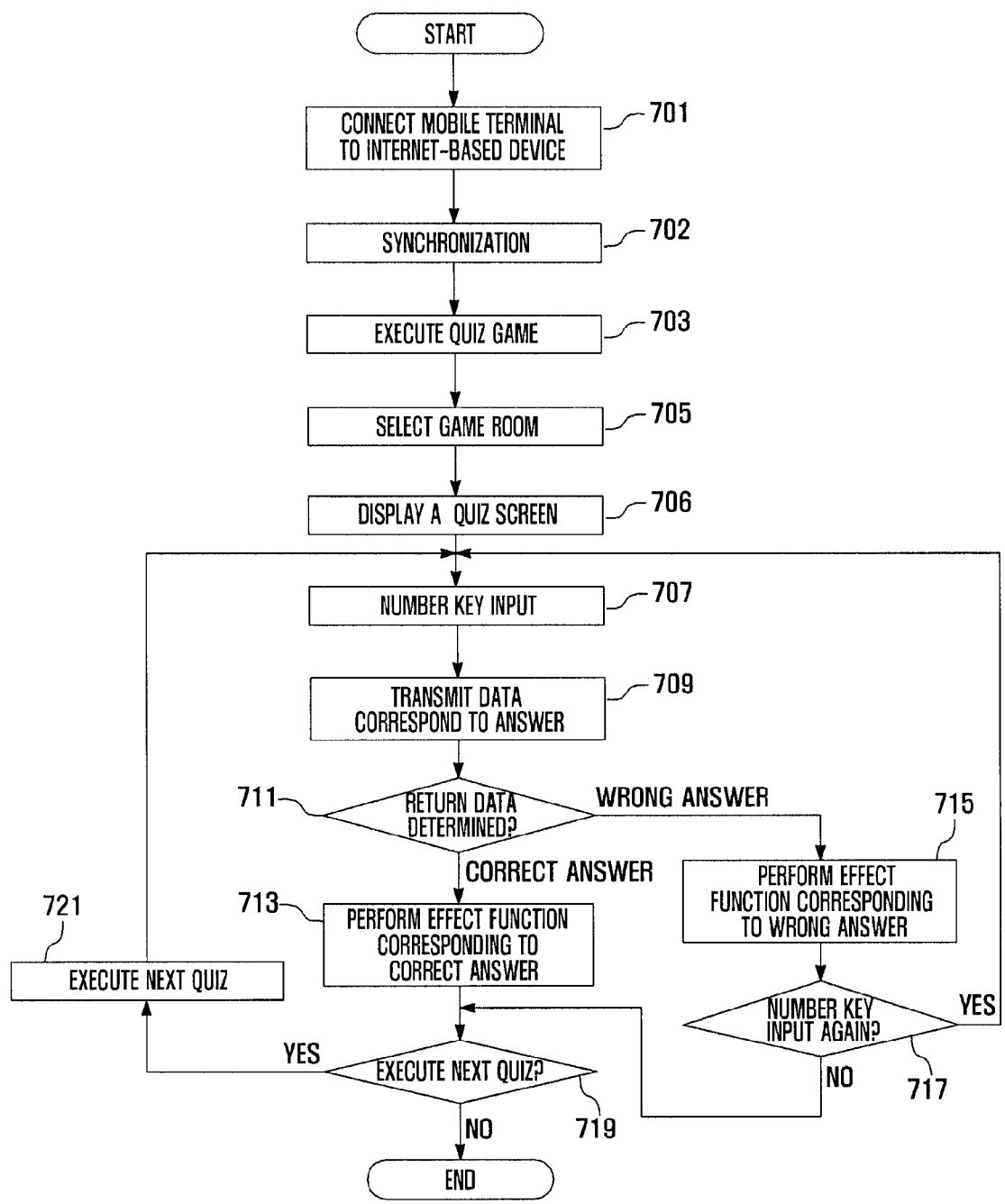
FIG. 17 is a flowchart illustrating an example of game execution in a mobile terminal according to an exemplary embodiment of the present invention.

FIG. 17 is a flowchart illustrating game execution in a mobile terminal according to an exemplary embodiment of the present invention, and FIGS. 18 to 24 views illustrating exemplary screens showing the game room creation according to the exemplary embodiment of the present invention of FIG. 17.

Referring now to FIGS. 17 to 24, the controller 100 controls the mobile terminal 10 to perform a connection with the Internet-based device 20 through the Internet network 60 for the execution of the quiz game (701). In this case, the controller 100 may connect the mobile terminal 10 with the Internet-based device 20 via wireless Internet. The game server 30 and the Internet-based device 20 may have been connected to each other through the Internet network 60 in advance. That is, the Internet-based device 20 may access the game server 30 according to user request. At that time, the game server 30 checks IP of the Internet-based device 20 and may connect the Internet-based device 20 having an acquired IP with the mobile terminal 10 according to the request from the mobile terminal 10.

When the mobile terminal 10 is connected with the Internet-based device 20, the controller 100 performs the synchronization of the mobile terminal 10 with the Internet-based device 20 through the game server 30 (702). When the synchronization is set, a user may check whether the quiz game is executed through the display unit of the Internet-based device 20. The synchronization may be applied to other mobile terminals to access the identical quiz game room. In other words, the game server 30 synchronizes a plurality of mobile terminals accessing an identical game room with the Internet-based device 20 and may transmit data on the execution of the quiz game. The data transmitted to the Internet-based device 20 may include a message regarding a correct answer of the quiz game and the data transmitted to the respective mobile terminals may be return data with respect to an answer of the quiz. Moreover, a screen displayed on the mobile terminal 10 may be displayed on the Internet-based device 20 by the game server 30.

With continued reference to FIG. 17, the controller 100 executes the quiz game (703). The controller 100 may detect an input signal on a specific quiz game selected by a user from the list of the quiz games.

Figure 18:
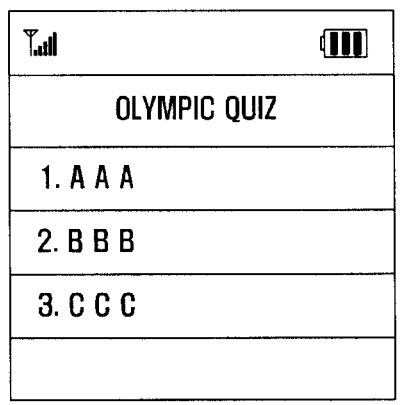
FIGS. 18 to 24 views illustrating exemplary screens showing the game room creation according to an exemplary embodiment of the present invention.
Figure 19:
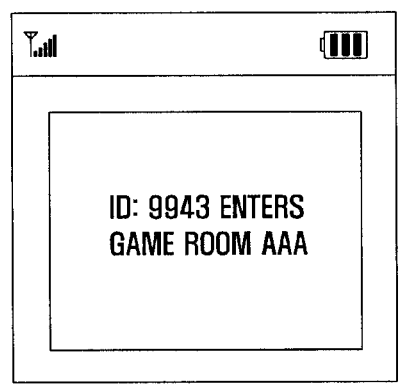

The controller 100 may detect a signal to select a game room of the quiz game (705). In this case, the controller 100 enters the selected game room and requests the game server 30 for the game room access in order to execute the quiz game. For example, as illustrated in FIG. 18, the controller 100 may transmit an input signal about a game room '1. AAA' selected from the list of the game rooms that is displayed on a screen to the game server 30. Moreover, with accessing to the game room as illustrated in FIG. 19, the controller 100 may display a message 'ID: 9943 enters AAA' preferably in a popup window on the display unit 120.

Figure 20:
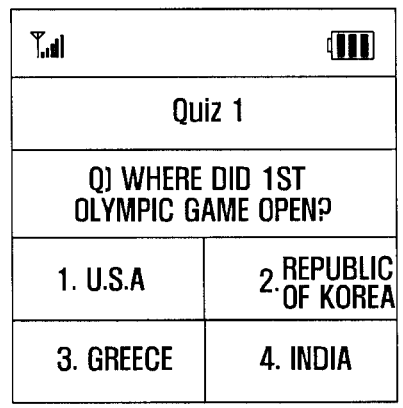

When accessing the game room, the controller 100 displays a quiz screen (706). For example, as illustrated in FIG. 20, the controller 100 may display a question screen corresponding to the quiz game.

When the quiz screen is displayed, the controller 100 may detect a number key input signal (707). The number key may be an input signal indicating an answer for the quiz that is input by a user.

When the number key is input, the controller 100 transmits data corresponding to the quiz to the game server 30 (709). The game server 30 determines whether the data are a correct answer and transmits return data corresponding to determination on whether the data are a correct answer to the mobile terminal 10.

Figure 21:
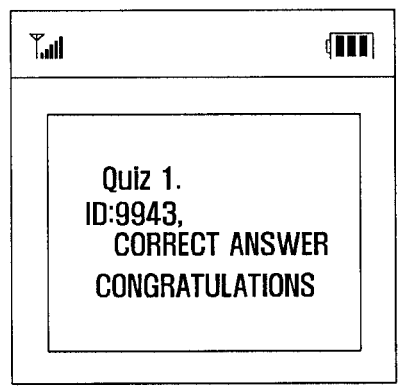

When the return data are received, the controller 100 checks the return data (711). When the return data are determined as data indicating the correct answer, the controller 100 executes an effect function corresponding to the correct answer (713). The effect function may include vibration effects, sound effects, and/or visual effects. For example, as illustrated in FIG. 21, the controller 100 may display a congratulation message on the display unit 120. That is, the controller 100 may display a message 'Quiz 1 ID: 9943, correct answer congratulations.' The controller 100 executes a procedure of checking whether a next quiz is executed (719).

Figure 22:
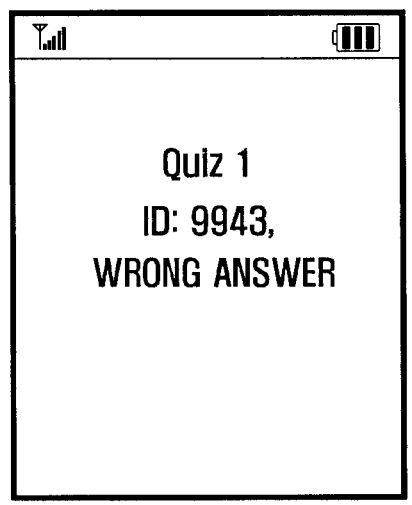

When the return data are the wrong answer, the controller 100 executes an effect function corresponding to the wrong answer (715). For example, as illustrated in FIG. 22, the controller 100 may display a message on the wrong answer on the display unit 120. That is, the controller 100 may display a message 'Quiz 1 ID; 9943. Wrong answer.' On the display unit 120.

Figure 23:
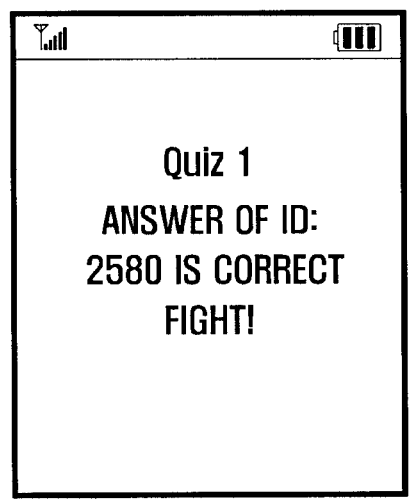

Moreover, when a plurality of mobile terminals uses the quiz game, the mobile terminal 10 may receive other return data from the game server 30 according to whether an answer of another mobile terminal is correct. For example, as illustrated in FIG. 23, the controller 100 may display a message 'Quiz 1 ID: 2580 is correct. Fight!' on the display unit 120.

Then, the controller 100 checks whether the number key is input again (717). When the number key is input again, the controller 100 transmits data corresponding to an answer for the quiz to the game server 30. When the number key is not input again, the controller 100 executes a procedure of checking whether a next quiz is executed.

Figure 24:
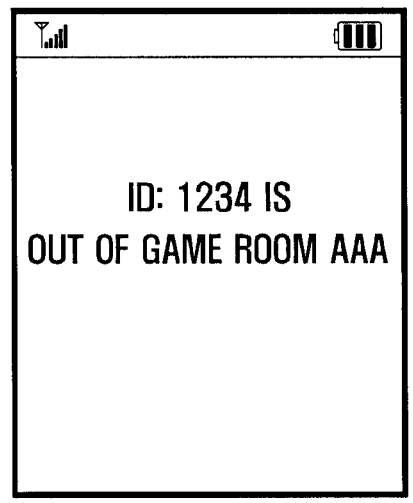

The controller 100 executes a procedure of checking whether a next quiz is executed (719). When execution of a next quiz is selected, the controller 100 may request the game server 30 to execute the next quiz (721). The game server 30 may determine whether all mobile terminals 10 participate in the quiz game requests for the execution of the next quiz. When a user of a specific mobile terminal finishes the quiz game, the game server 30 may transmit a message corresponding thereto to other mobile terminals that are executing the quiz game and the Internet-based device 20. For example, as illustrated in FIG. 24, the controller 100 may display a message 'ID: 1234 is out of this game room AAA.' on the display unit 120. When the execution of the next quiz is not requested, the controller 100 may finish the execution of the quiz game.

According to the present invention, a user may manipulate a game using a mobile terminal while watching a game screen through an Internet-based device and an interactive system for performing feedback of data as a result of playing the game to execute an effect function. Moreover, the user may realize a system for providing a game screen through an Internet-based device having a screen larger than that of a mobile terminal. Due to advantages such that a plurality of users can play the game through respective mobile terminals simultaneously, commercial benefits of a game may be improved in association with an event and television broadcasting stations.

The exemplary embodiments of the present invention are provided for the easy description and understanding of the present invention with specific examples but do not limit the scope of the present invention. It will be appreciated by those skilled in the art that various changes and modifications may be practiced without departing from the spirit of the present invention nor the scope of the appended claims.

What is claimed is:

1. A game system comprising:
    a specific Internet-based device connectable with a mobile terminal through a game server, for receiving a game screen of a specific game executed in the mobile terminal from the game server and displaying the received game screen;
    the game server which connects and synchronizes the specific Internet-based device with the mobile terminal, transmits the game screen synchronously to the specific Internet-based device and the mobile terminal, receives an input signal for manipulating the specific game from the mobile terminal, and transmits return data corresponding to the input signal to the mobile terminal and the specific Internet-based device; and
    the mobile terminal for downloading game data of the specific game from the game server, initiating a request for a connection synchronized with the specific Internet-based device to the game server connecting to the specific Internet-based device via an IP address of the specific Internet-based device acquired from the game server, under a control of the game server, executing the specific game, while the specific Internet-based device is connected with the mobile terminal, wherein the game screen displayed on the mobile terminal is synchronously displayed on the specific Internet-based device, transmitting the input signal for manipulating the specific game to the game server, and executing an effect function corresponding to the return data.

2. The game system of claim 1, further comprising a download server for transmitting the game data according to a request from the mobile terminal.

3. The game system of claim 1, wherein the return data are transmitted to the mobile terminal by determining whether data input from the mobile terminal are a correct answer.

4. The game server of claim 3, wherein the mobile terminal executes an effect function corresponding to the correct answer when the return data indicate the correct answer, and the mobile terminal executes an effect function corresponding to a wrong answer when the return data indicate the wrong answer.

5. The game system of claim 1, further comprising a game database server including avatar information, user information, and data for executing a game.

6. The game system of claim 1, wherein the Internet-based device outputs at least one of sound information and a message information in correspondence with the return data from the game server.

7. The game system of claim 1, wherein the game server performs authentication for the mobile terminal using an identification information of the mobile terminal including at least a part of a telephone number of the mobile terminal.

8. The game system of claim 1, wherein the mobile terminal executes the effect function in at least one of visual, tactile, and audible form according to a type of the return data.

9. A method of executing a game in a mobile terminal, the method comprising:
    downloading, by the mobile terminal, data on a specific game from a game server according to a user request;
    requesting, by the mobile terminal to the game server, a connection with a specific Internet-based device via an IP address acquired from the game server;
    connecting to the specific Internet-based device under a control of the game server;
    executing, by the mobile terminal, the specific game, while the specific Internet-based device is connected with the mobile terminal, wherein a game screen being displayed on the mobile terminal is synchronously displayed on the specific Internet-based device;
    transmitting, by the mobile terminal, an input signal corresponding to a user input to the game server while the specific Internet-based device is connected with the mobile terminal; and receiving, by the mobile terminal, return data corresponding to the input signal from the game server and performing an effect function according to the return data.

10. The method of claim 9, wherein the specific game comprises one of a subjective game requiring entry of a manually-entered answer and a multiple choice game.

11. The method of claim 10, wherein the return data are transmitted to the mobile terminal after determining that data input from the mobile terminal are an correct answer.

12. The method of claim 9, wherein the executing the specific game comprises outputting an execution screen of the specific game.

13. The method of claim 9, further comprising:
detecting a request signal for creating a game room;
determining whether a wire/wireless interworking game room is created when the request signal for creating a game room;
outputting a screen to set a title and a password of the wire/wireless interworking game room when the request signal is a signal for creating the wire/wireless interworking game room; and
outputting a screen to input the title of a wire game room when the request signal comprises a signal for creating the wire game room.

14. The method of claim 9, wherein the performing the effect function comprises:
determining the return data;
applying an effect function corresponding to a correct answer when the return data indicate a correct answer; and
applying an effect function corresponding to a wrong answer when the return data indicate a wrong answer.

15. The method of claim 9, wherein the executing the specific game comprises executing the specific game according to a user input for the game executing.

16. A mobile terminal connectable with a specific Internet-based device through a game server and providing a specific game, the mobile terminal comprising:
a wireless communication unit to download data on a specific game from the game server, to transmit a request for a connection with the specific Internet-based device via an IP address of the specific Internet-based device acquired from the game server and to transmit an input signal corresponding to an input of a user to the game server while the specific Internet-based device is connected with the mobile terminal; and to receive return data corresponding to the input signal from the game server;
an input unit for detecting an input signal corresponding to an input of a user for manipulating the specific game; and
a controller to execute the specific game while the specific Internet-based device is being connected with the mobile terminal, wherein a game screen being displayed on the mobile terminal is synchronously displayed on the specific Internet-based device, and to perform an effect function according to return data corresponding to the input signal.

17. The mobile terminal of claim 16, further comprising a display unit to display an execution screen of the specific game and a screen corresponding to the return data.

18. The mobile terminal of claim 16, wherein the controller performs the effect function in at least one of visual, tactile, and audible form according to the return data.

19. The mobile terminal of claim 16, wherein the controller executes the specific game according to a user input for the game executing.

20. A method of executing a game in an Internet-based device comprising:
establishing, by the Internet-based device, a communication channel with a game server;
receiving signals for connecting with a mobile terminal via an IP address of the Internet-based device acquired by the mobile terminal from the game server, and for displaying a game screen simultaneously with the mobile terminal under control of the game server; and
outputting the game screen, which corresponds to a game that is requested to be executed by the mobile terminal from the game server to enable a user of the mobile terminal to view the game screen on the Internet-based device while the game is executed by the mobile terminal and simultaneously displayed at the mobile terminal.

21. The method of claim 20, further comprising:
receiving, by the Internet-based device, return data from the game server corresponding to an input signal that is input by the at least one mobile terminal; and
outputting, by the Internet-based device, at least one of sound information and message information corresponding to the return data.

22. The method of claim 20, wherein the Internet-based device comprises a multi-media display device adapted to receive digital signals over a packet switched network.

* * * * *

UNITED STATES PATENT AND TRADEMARK OFFICE
CERTIFICATE OF CORRECTION

| | | |
|---|---|---|
| PATENT NO. | : 8,876,609 B2 | Page 1 of 1 |
| APPLICATION NO. | : 12/691032 | |
| DATED | : November 4, 2014 | |
| INVENTOR(S) | : Park et al. | |

It is certified that error appears in the above-identified patent and that said Letters Patent is hereby corrected as shown below:

In the Claims

Column 14, Claim 1, Line 11 should read
--...a connection with the...--

Column 14, Claim 1, Line 12 should read
--...game server, connecting to...--

Column 15, Claim 11, Line 9 should read
--...are a correct answer...--

Column 16, Claim 16, Line 5 should read
--...device is connected with...--

Signed and Sealed this
Fifteenth Day of September, 2015

Michelle K. Lee
*Director of the United States Patent and Trademark Office*